United States Patent [19]

Ramseyer et al.

[11] Patent Number: 5,757,875
[45] Date of Patent: May 26, 1998

[54] METHOD OF TOOTH DETECTION

[75] Inventors: Mark S. Ramseyer, Livonia; Rollie M. Fisher, Trenton, both of Mich.; Rudolf Bettelheim, Buda; Vernon B. Goler, Austin, both of Tex.

[73] Assignees: Ford Motor Company, Dearborn, Mich.; Motorola, Inc., Schaumburg, Ill.

[21] Appl. No.: 626,161

[22] Filed: Apr. 1, 1996

[51] Int. Cl.$^6$ ............................................. G06M 3/00
[52] U.S. Cl. ............................................. 377/3; 377/24
[58] Field of Search ............................................. 377/3, 16, 24

[56] References Cited

U.S. PATENT DOCUMENTS

| | | | |
|---|---|---|---|
| 3,883,758 | 5/1975 | Lechren | 310/41 |
| 4,273,089 | 6/1981 | Maier | 123/417 |
| 4,284,045 | 8/1981 | Main | 123/416 |

Primary Examiner—Margaret Rose Wambach
Attorney, Agent, or Firm—Peter Abolins, Esq.; Roger L. May, Esq.

[57] ABSTRACT

A method for identifying a principal tooth in a series of teeth extending along at least a portion of a periphery of a rotatable object includes the steps of rotating the rotatable object, setting a counter to a predetermined value, measuring a first tooth in the series of teeth to obtain a first measurement, adding a qualifying value to the measurement to obtain a qualification measurement, measuring a second tooth in the series of teeth to obtain a second measurement, comparing the second measurement to the qualification measurement, and identifying the second tooth as the principal tooth when the second measurement exceeds the qualification measurement.

18 Claims, 3 Drawing Sheets

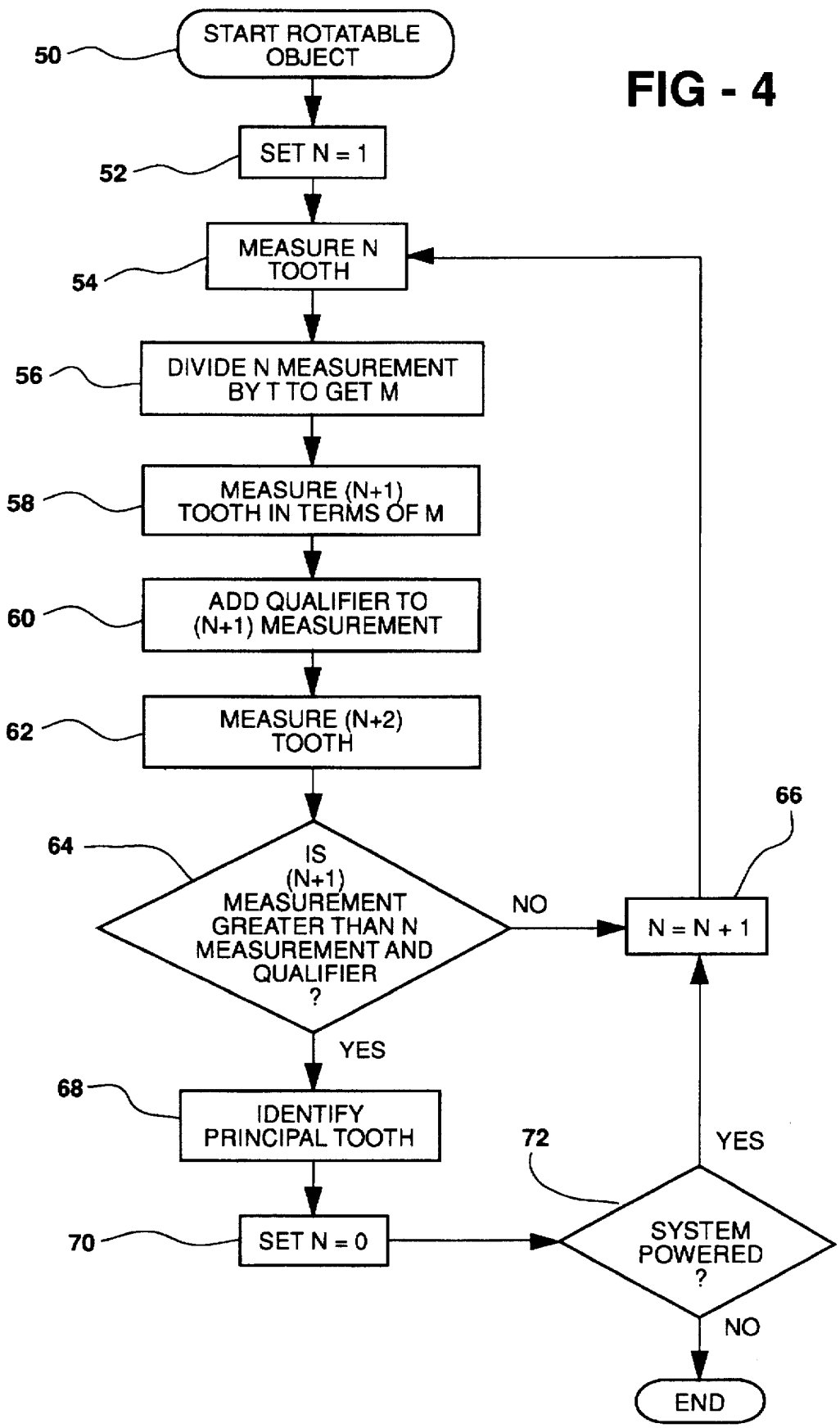

METHOD OF TOOTH DETECTION

BACKGROUND OF THE INVENTION

1. Field of the Invention

The present invention relates generally to a method for identifying the position of a rotating object and, more specifically, to a method for accurately identifying the position of a rotating object via tooth detection.

2. Description of the Related Art

In environments relying on the coordination of several moving and rotating objects or parts, it is desirable to be able to accurately determine the orientation of a moving object. In an automotive vehicle, where several objects are rotating, this determination is imperative. One method of identifying the orientation of a moving object is to align a series of teeth around or along a periphery of the rotating object. The series has a beginning and an end identified by a portion of the periphery whereat no teeth exist. This portion where a tooth does not exist is commonly referred to as a missing tooth. The identification of a missing tooth is performed by measuring the time between the last tooth in the series and the first tooth in the series. If such a time exceeds a time previously established to identify a missing tooth, typically 1.5 times the time it takes a tooth to pass by a sensor, it is determined that the location of the missing tooth has been determined from which the first or principal tooth in the series can be identified as that tooth being next to the missing tooth, i.e., the extended space void of a tooth.

One disadvantage of the above method is that the method relies on a step of multiplication which requires more circuitry than a step of addition. The additional circuitry increases the cost of the method. Another disadvantage of the above method is that the measurements occur in the time domain. At times when the rotating part is accelerating, either positively or negatively, the perceived time in which the missing tooth exists shortens or lengthens, respectively. Therefore, the possibility of false readings exist when using this method.

SUMMARY OF THE INVENTION

Accordingly, the present invention is a method for identifying a principal tooth in a series of teeth extending along at least a portion of a periphery of a rotatable object. The method begins with the step of rotating the rotatable object. Once the object is rotating, a counter is set to a predetermined value. A first tooth is measured in the series of teeth to obtain a first measurement. A qualifying value is added to this first measurement to obtain a qualification measurement. A second tooth is located. The space between the first tooth and the second tooth in the series of teeth is measured to obtain a second measurement. The second measurement is compared to the qualification measurement. The second tooth is identified as the principal tooth when the second measurement exceeds the qualification measurement.

One advantage of the present invention is the ability to identify the principal tooth in a series of teeth around a rotatable object without multiplying each measurement, resulting in a great reduction in the amount of circuitry required. Another advantage of the present invention is the ability to identify the principal tooth in the series of teeth in dynamic situations, e.g., when the rotatable object is accelerating. Yet another advantage of the present invention is the robustness of the system, i.e., the ability to simply modify the qualifier, the number of teeth, the number of missing teeth, the tooth edges, and the like, without changing the sensing hardware.

Other advantages and features of the present invention will be readily appreciated as the same becomes better understood by reference to the subsequent description when considered in connection with the accompanying drawings.

BRIEF DESCRIPTION OF THE DRAWINGS

FIG. 4 is a flowchart of a second embodiment of a method according to the present invention.

DESCRIPTION OF THE PREFERRED EMBODIMENT(S)

Figure 1:
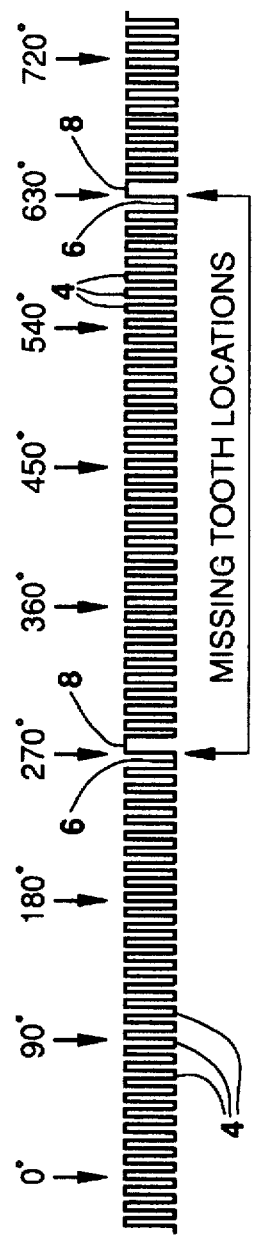
FIG. 1 is an output of a sensor identifying the location of teeth as a function of the degree of rotation.

Referring to FIG. 1, a graphic representation of one example of a one engine cycle in a four cylinder internal combustion engine is shown. As can be seen from the graphic representation, there are thirty-six teeth 4 per revolution with one portion 6 of the periphery of a rotatable object (not shown) where a tooth is not present. This position is commonly referred to as the "missing tooth." It should be apparent to those skilled in the art that more than one missing tooth may be utilized adjacent to the first missing tooth or in spaced relation thereto.

In one embodiment, a single missing tooth is used. Each tooth position (including the missing tooth position) represents 10° (ten degrees) of rotation for the rotatable object wherein the rotatable object is generally circular in cross section. Having 10° of the periphery without a tooth, e.g., the missing tooth position, reduces the resolution of the information regarding the speed and orientation of the rotating object. The missing tooth does, however, provide an exact location of the first tooth 8, hereinafter referred to as the principal tooth, of the series of teeth. It should be appreciated that knowing the location of the principal tooth 8 accurately identifies the orientation of the rotating object.

Figure 2:
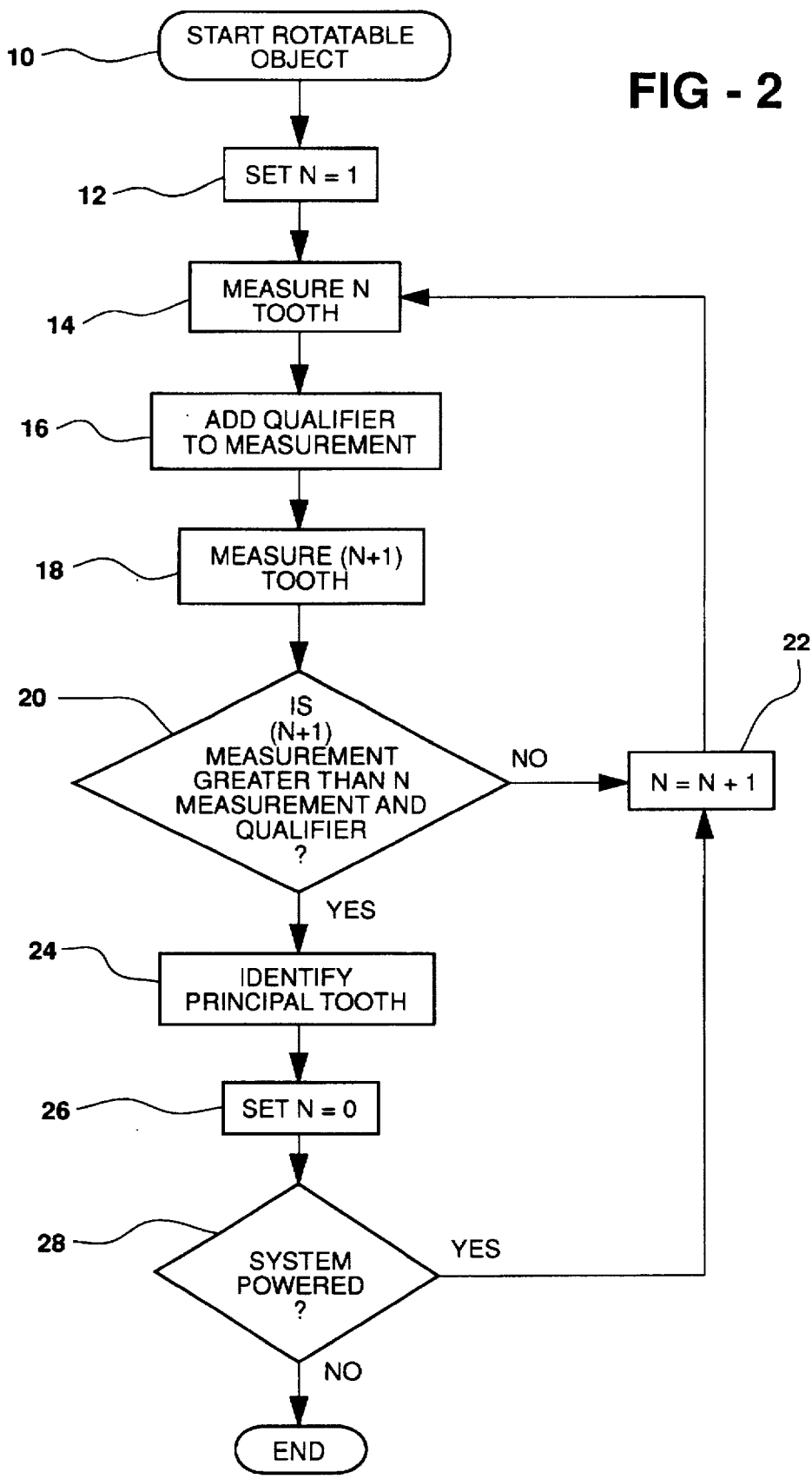
FIG. 2 is a flowchart of one embodiment of a method according to the present invention.

Referring to FIG. 2, a flowchart representation of one embodiment of a method, according to the present invention, is generally shown. The method for identifying the principal tooth 8 in a series of teeth extending along at least a portion of a periphery of a rotatable object includes the first step of rotating the rotatable object, at 10. It is noted at this time that the series of teeth may extend along either a portion of the periphery of the rotatable object or along the whole periphery of the rotatable object. In the former example, the rotatable object would include a plurality of series of teeth, each of which would have a principal tooth 8. In the latter example, as shown in FIG. 1, the rotatable object would have a single series of teeth having a single principal tooth.

Once the rotatable object is rotating, the method includes setting a counter to a predetermined value, at 12. In one embodiment, the predetermined value, N, is set to 1. Once the counter has been set to the predetermined value N, the method includes measuring a first tooth in the series of teeth to obtain a first measurement of the, N tooth, at 14. The first tooth measured will not necessarily be the principal tooth 8 because it cannot be determined what the exact orientation of the rotatable object is. "As would be appreciated by those skilled in the art, any sensor type, a variable reluctance sensor (not shown) in this embodiment, as well as any degree of resolution, maybe used."

The first measurement is performed in terms of the angle domain. More specifically, each of the teeth and its related preceding space in the series occupy a composite space around the rotating object equal to a particular angle. In one embodiment, each of the teeth occupy 10° with a fifty percent (50%) duty cycle. Measurements have a resolution of 1°. It should be appreciated by those skilled in the art the sensor type, a variable reluctance sensor (not shown) in this embodiment, as well as any degree of resolution, may be used.

Once the first measurement is obtained, the method includes adding a qualifying value, or qualifier, to the first measurement at 16 to create a qualification measurement. The qualification measurement is a threshold value wherein another tooth which has a measurement which exceeds the qualification measurement is identified as the principal tooth 8.

Further, the method includes measuring a second tooth at 18. The second tooth measured is identified by the incrementation of the counter. Therefore, in relation to the first tooth, the second tooth is identified as N+1. In one embodiment, the second tooth is adjacent the first tooth. Upon measuring the second tooth (N+1), the method includes comparing the second measurement, associated with the second tooth, against the qualification measurement at 20. If the qualification measurement is greater than the second measurement, the method includes incrementing the counter at 22 whereafter the second tooth becomes the first tooth and the next tooth after the second tooth becomes the second tooth for purposes of comparison. If the second measurement is greater than the qualification measurement, the method includes identifying the second tooth as the principal tooth 8 at 24.

After the principal tooth 8 has been identified, the method includes setting the counter to a predetermined value such as zero at 26. Then the method determines if the system is powered at 28. If so, the counter is again incremented at 22 for continued measurement. If not, however, the method is terminated.

Figure 3:
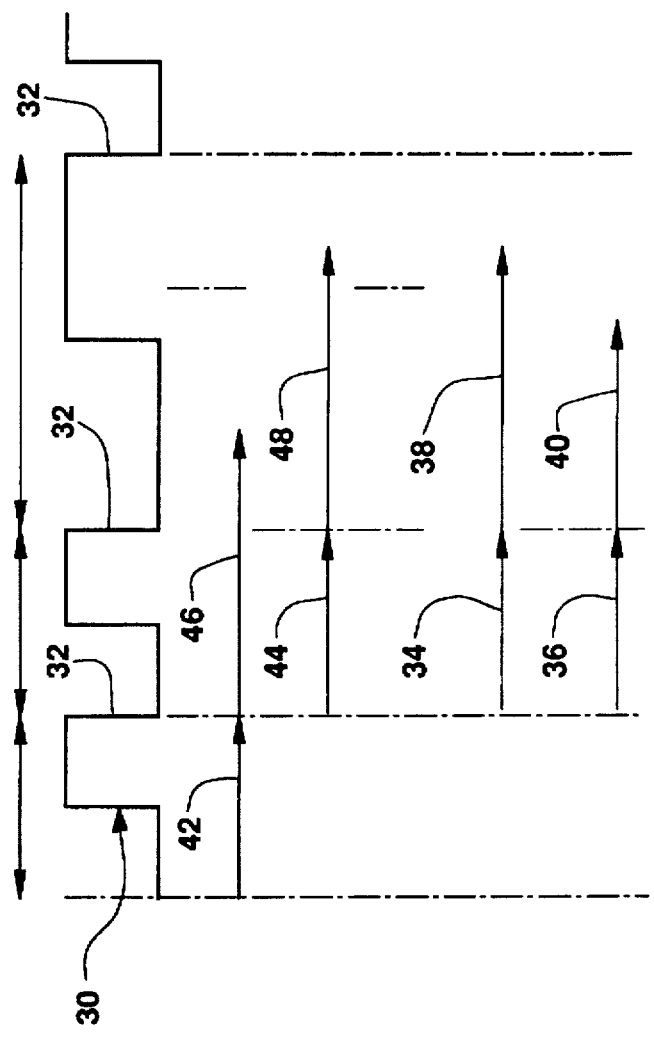
FIG. 3 is a comparison between a time based system and a system using the method of FIG. 2.

Referring to FIG. 3, a square wave signal, generally shown at 30, is a conditioned signal representing a rotating object having a series of teeth extending therearound. The falling or negative edge 32 on the square wave represents the passing of a tooth such that the flux lines created by the magnetic source are at a zero crossing, i.e., they are changing direction in magnitude with respect to the variable reluctance sensor. It is at this zero crossing that the tooth is measured and identified.

As may be seen by viewing arrow 34, a representation of the measurement of a tooth approximates 10° during a zero acceleration period. Therefore, when the qualification value, 5°, is added to the measurement, the qualification measurement equals 15° as represented by arrow 38.

The arrows 34, 36, 38, 40 may be compared with the time based measurements and calculations of the related art as represented in FIG. 3 by arrows 42, 44. The time based measurements 42, 44 are multiplied by a factor, typically 1.5 for a single missing tooth design, to obtain the calculations represented by arrows 46, 48. This result is not as robust during acceleration and deceleration situations.

A second embodiment of the present invention is graphically represented by a flow chart in FIG. 4. In this method, the object begins to be rotated at 50. Once the object is rotating, a counter is set to a predetermined value, one (1) in this embodiment, at 52. The N tooth is then measured, at 54. The N measurement is then divided by the subdivision value, T, to get a length of an angular measurement, M, at 56. The angular measurement is referred to as a "degree tick." The N+1 tooth is then measured in terms of the degree tick, M, at 58. A qualification value is then added to the N+1 tooth, at 60. The N+2 tooth is then measured, at 62, in terms of degree ticks, M. A comparison is then made between the third tooth, the N+2 tooth, and the qualification measurement, i.e., the second tooth, N+1 tooth, and the qualification value, at 64. If the third tooth does not measure to be greater than the qualification measurement, the counter is incremented, at 66, and the N tooth is then measured, at 54, and the loop continues as described above. If, however, the third tooth, N+2 tooth, is greater than the qualification measurement, the third tooth, the N+2 tooth, is identified as the principal tooth, at 68. The counter is then set to a predetermined value, zero (0) in this embodiment, at 70. The system is then tested to determine if it is powered, at 72. If so, the counter is incremented at the N tooth is measured at 54. If not, the method is ended. This embodiment of the present invention is a robust method which is capable of determining acceleration, positively or negatively, of a rotating object from tooth to tooth.

Returning attention to FIG. 3, when the rotating object is in a condition of positive acceleration, the measurement of the tooth equals 8° shown by a representation arrow 36. By adding a same qualifier to the 8° measurement, the qualification measurement changes to 13°, as represented by arrow 40, from 15°. It is this modification in the qualification measurement which more accurately identifies a threshold beyond which a principal tooth 8 may be identified.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method for identifying a principal tooth in a series of teeth extending along at least a portion of a periphery of a rotatable object, the method comprising the steps of:

rotating the rotatable object;

setting a counter to a predetermined value;

measuring a first tooth in the series of teeth to obtain a first measurement;

adding a qualifying value to the measurement to obtain a qualification measurement;

measuring a second tooth in the series of teeth to obtain a second measurement;

comparing the second measurement to the qualification measurement; and identifying the second tooth as the principal tooth when the second measurement exceeds the qualification measurement.

2. A method as set forth in claim 1 wherein the step of measuring the first tooth is performed in an angle domain.

3. A method as set forth in claim 1 wherein the step of measuring the second tooth is performed in an angle domain.

4. A method as set forth in claim 1 wherein the step of identifying the second tooth includes the step of measuring a tooth adjacent to the first tooth.

5. A method as set forth in claim 1 including the step of incrementing the counter by one when the qualification measurement exceeds the second measurement.

6. A method as set forth in claim 1 including the step of setting the counter to a predetermined value when the second measurement exceeds the qualification measurement.

7. A method as set forth in claim 6 including the step of incrementing the counter when a principal tooth has been identified.

8. A method for identifying a principal tooth in a series of teeth extending along a periphery of a rotatable object, the method comprising the steps of:

rotating the rotatable object;

setting a counter to a predetermined value;

measuring a first tooth in the series of teeth to obtain a first measurement in an angle domain;

adding a qualifying value to the measurement to obtain 4 qualification measurement;

measuring a second tooth in the series of teeth to obtain a second measurement in the angle domain;

comparing the second measurement to the qualification measurement; and identifying the second tooth as the principal tooth when the second measurement exceeds the qualification measurement.

9. A method as set forth in claim 8 wherein the step of identifying the second tooth includes the step of measuring a tooth adjacent the first tooth.

10. A method as set forth in claim 8 including the step of incrementing the counter by one when the qualification measurement exceeds the second measurement.

11. A method as set forth in claim 8 including the step of setting the counter to a predetermined value when the second measurement exceeds the qualification measurement.

12. A method for identifying a principal tooth in a series of teeth extending along at least a portion of a periphery of a rotatable object, the method comprising the steps of:

rotating the rotatable object;

setting a counter to a predetermined value;

measuring a first tooth in the series of teeth to obtain a first measurement;

dividing the first measurement by a predetermined subdivision value to obtain a length;

measuring a second tooth to obtain a second measurement in terms of the length;

adding a qualifying value to the second measurement to obtain a qualification measurement;

measuring a third tooth in the series of teeth to obtain a third measurement;

comparing the third measurement to the qualification measurement; and identifying the third tooth as the principal tooth when the third measurement exceeds the qualification measurement.

13. A method as set forth in claim 12 wherein the step of measuring the first tooth is performed in an angle domain.

14. A method as set forth in claim 12 wherein the step of measuring the second tooth is performed in an angle domain.

15. A method as set forth in claim 12 wherein the step of measuring the second tooth includes the step of measuring a tooth adjacent the first tooth.

16. A method as set forth in claim 12 including the step of incrementing the counter by one when the qualification measurement exceeds the third measurement.

17. A method as set forth in claim 12 including the step of setting the counter to a predetermined value when the third measurement exceeds the qualification measurement.

18. A method as set forth in claim 17 including the step of incrementing the counter when said principal tooth has been identified.

* * * * *